May 6, 1952  J. T. BAILEY  2,595,626
BRIDGE CIRCUIT
Filed April 21, 1949

*INVENTOR.*
JOHN T. BAILEY
BY
ATTORNEY

Patented May 6, 1952

2,595,626

UNITED STATES PATENT OFFICE 2,595,626

BRIDGE CIRCUIT

John T. Bailey, Short Hills, N. J.

Application April 21, 1949, Serial No. 88,883

9 Claims. (Cl. 175—183)

The present invention relates to an improved bridge circuit suitable especially, though not limitatively, for testing or determining impedances such as capacity, inductance or resistance by comparison with a fixed or standard impedance.

Known measuring and testing devices employing a bridge circuit and zero or null indicating system are either restricted in their range, or if designed for an extended measuring range will become bulky and expensive to an extent to preclude their universal use for servicing or testing electrical devices, in particular radio and television sets. This is due primarily to the inadequacy of the null indication method which is either insensitive or will require substantial auxiliary equipment in the form of amplifiers, rectifiers, power supplies and other auxiliary apparatus.

Accordingly, an object of the present invention is the provision of an improved general purpose alternating current bridge circuit operable directly from an existing power or lighting circuit and adapted to produce an instant and substantial unbalance current or current variation as a result of a slight unbalance of the bridge in either direction from the balance position.

Another object is the provision of a general purpose bridge circuit of this type which operates on a maximum rather than minimum or null indication in the balance position and wherein the balance current is substantially independent of the bridge operating current and may be adjusted to suit special requirements and conditions.

Among the more specific objects of the invention is the provision of an improved testing or measuring bridge circuit, especially for quickly determining the impedance values of capacitors, inductors and resistors and which while of small size and bulk has an extended measuring range compared with known devices of equivalent size and cost; which is based upon a maximum rather than a minimum current indicating the balance position; in which the maximum or balance current may be adjusted substantially independently of the bridge operating current; which may be directly operated from an existing A. C. power or lighting system; and which will be equally suited for testing capacity, inductance and resistance in a simple and easy manner.

Figure 1:
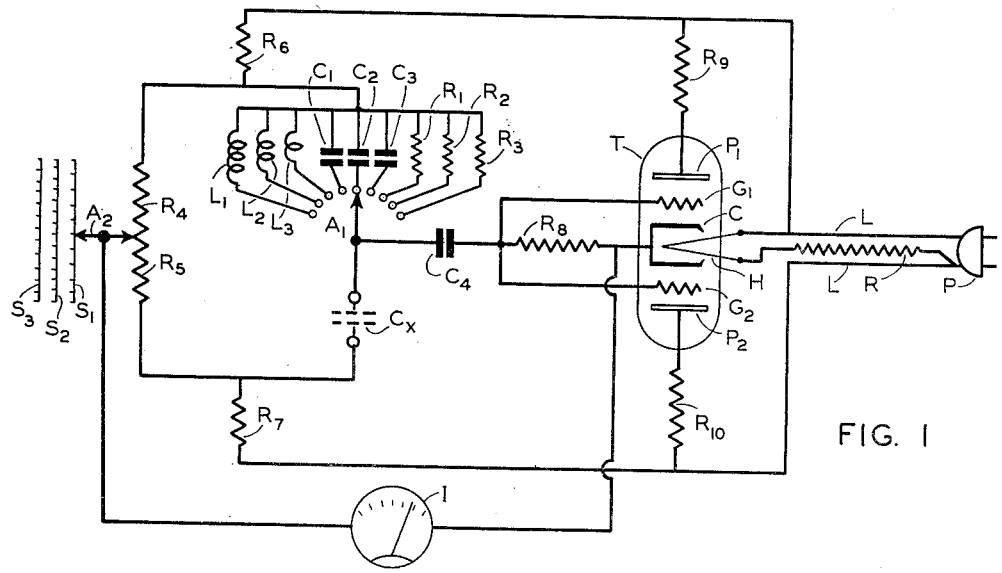
Figure 2:
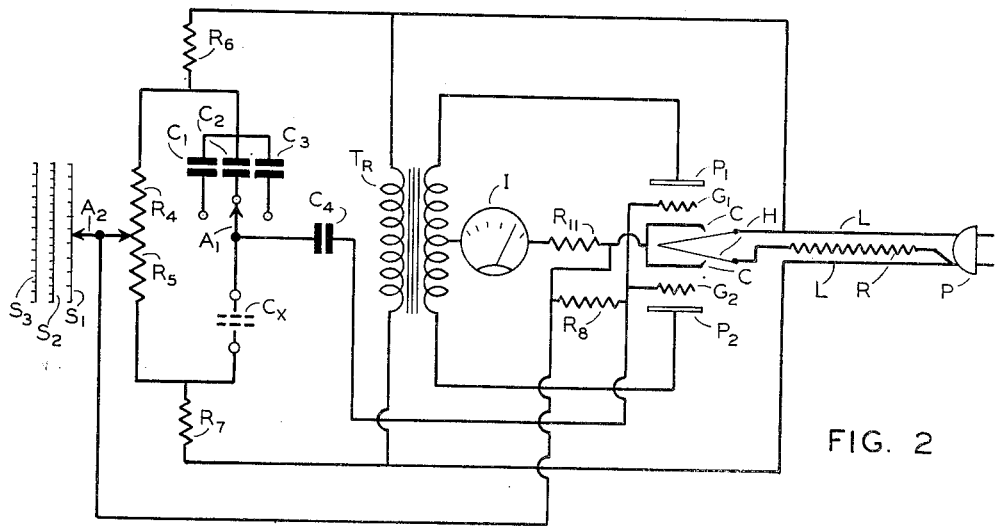

The invention will be better understood from the following detailed description taken in connection with the accompanying drawing forming part of this specification and in which:

Fig. 1 is a circuit diagram of an improved bridge circuit constructed in accordance with the invention; and Fig. 2 is a modification of the circuit shown in Fig. 1.

Like reference characters identify like parts in both views of the drawing.

Referring more particularly to Fig. 1, there is shown a general purpose Wheatstone bridge circuit comprising a pair of resistance arms $R_4$ and $R_5$ constituting one branch of the bridge circuit and serving to establish a variable impedance ratio, the remaining branch of the bridge comprising the unknown impedance in the form of a condenser $C_x$ in the example shown and a standard impedance comprising one of a plurality of selectively connectable fixed condensers $C_1$, $C_2$ and $C_3$. In place of measuring capacity values, the arrangement may equally serve for measuring or testing inductance or ohmic resistance, for which purpose there have been shown in the drawing three standard induction coils $L_1$, $L_2$ and $L_3$ and three standard resistors $R_1$, $R_2$ and $R_3$ all selectively connectable by means of a multiple switch $A_1$, in a manner readily understood. In the modification shown in the drawing, the bridge circuit is operated with the standard impedance in one of the branch circuits connected by the switch $A_1$ being constant or fixed, while the impedance ratio in the cooperating branch circuit is varied by means of the adjustable contact $A_2$ forming a potentiometer together with the ratio arms $R_4$ and $R_5$ in a manner readily understood. Alternatively, the bridge may be operated by providing an adjustable standard impedance such as a variable condenser replacing the fixed condenser $C_2$ in the drawing, in which case the bridge ratio between resistors $R_4$ and $R_5$ is maintained at a constant value.

The free ends of resistance arms $R_4$ and $R_5$ representing one pair of diagonal or conjugate points of the bridge circuit are connected by way of series resistors $R_6$ and $R_7$ to a suitable source of alternating current such as an audio-frequency oscillator or preferably directly to a 60 cycle alternating current power or house lighting circuit. For this purpose, there are shown in the drawing a pair of connecting lines L terminating in a plug P insertable in a standard line socket. The remaining conjugate points of the bridge represented by the switch or contact arms $A_1$ and $A_2$ are connected to both control grids $G_1$ and $G_2$, on the one hand, and to the common cathode C, on the other hand, of a double-triode amplifier tube T by way of a coupling network comprising, in the example shown, a coupling condenser $C_4$ and grid leak resistance $R_8$. The anodes or plates $P_1$ and $P_2$ of the double-triode T are connected to the alternating current power source through individual series or bleeder resistors $R_9$ and $R_{10}$ respectively, in the manner shown. The common cathode C is heated to electron emitting temperature by means of a heater H also energized from the A. C. power source through a suitable series resistance R which may be included in the line connecting cord, in a manner well known in the art. The plate circuits for both triode sections of the tube T are completed or returned to the power supply through a connection between the common cathode C and the adjusting or sliding contact $A_2$ of the variable ratio or potentiometer branch of the bridge circuit, said connection including a suitable current indicator such as a microammeter or milliammeter I.

In an arrangement of this type employing a fixed or comparison impedance and an adjustable bridge ratio, the latter, upon adjustment of the bridge to balance condition, will be a direct measure of the unknown impedance to be determined. As a consequence, the adjusting contact $A_2$ may be provided with a pointer or index cooperating with a plurality of indicating scales $S_1$, $S_2$ and $S_3$ each coordinated to a different fixed or standard impedance and being directly calibrated in units of the respective impedance to be determined or measured. The provision of a plurality of standard impedances, such as condensers $C_1$, $C_2$ and $C_3$ and coordinated capacity indicating scales $S_1$, $S_2$ and $S_3$ results in an increased total measuring range, in a manner customary with devices and systems of this type.

The operation of the system described is as follows: Assuming that the bridge is properly balanced, i. e. that the ratio between the unknown capacity $C_x$ to the standard capacity $C_2$ is equal to the resistance ratio between $R_5$ and $R_4$, no potential will be applied to either grid $G_1$ and $G_2$ of the double-triode, whereby the latter acts as a double wave rectifier in allowing current to pass alternately between the anodes $P_1$ and $P_2$ and the common cathode C and through the return circuit including the indicator I. The amplitudes of the successive uni-directional current half-cycles flowing through the indicator are adjusted to have a predetermined or maximum value, indicated by a suitable index mark on the meter scale, by adjusting bleeder resistors $R_9$ and $R_{10}$ in the anode leads of the tube. The indicator I is suitably designed to have a sufficient damping or additional current smoothing means may be employed to reduce the ripple in the rectified current and to insure a steady pointer deflection, in a manner readily understood by those skilled in the art.

If the bridge is unbalanced such as by moving the contact $A_2$ in the upward direction, an alternating unbalance voltage will be impressed simultaneously between both grids $G_1$ and $G_2$ and the cathode C. As a consequence thereof, both grids will draw current during the positive half cycles of the impressed voltage, thus negatively charging the condenser $C_4$ and in turn reducing the electron discharge or space current to the anodes $P_1$ and $P_2$. This results in a decrease of the meter current below the maximum balancing value, thereby apprising the operator that the bridge is unbalanced. Adjustment of the contact $A_2$ to a position where the current through the indicator I reaches its predetermined or balancing value, will restore the balance of the circuit.

If the bridge is unbalanced in the opposite direction such as by moving the contact $A_2$ downwardly from the balance position shown in the drawing, this will again result in an alternating unbalance voltage being impressed between the grids $G_1$, $G_2$ and the cathode, this unbalance voltage being 180° out of phase with the unbalance voltage obtained by the previous unbalance in the opposite direction. However, since electron current can only flow to the grids $G_1$ and $G_2$ during the positive half cycles of the unbalanced voltage, it is seen that again the condenser $C_4$ will be charged negatively in substantially the same manner as in the first place or unbalance in the opposite direction. In other words, any unbalance of the bridge circuit in either direction will result in an instantaneous decrease of the deflection of the indicator from its maximum or balance position, thus enabling an instant and accurate balancing adjustment or control. In order to insure a steady negative grid bias by the unbalance voltage, the time constant of the coupling circuit $C_4$-$R_8$ should be suitably chosen to prevent the charge upon condenser $C_4$ from prematurely leaking off through the resistance $R_8$. In other words, the latter should have a sufficient value to maintain the charge upon condenser $C_4$ for at least one-half cycle of the alternating current, as is understood.

From the foregoing it is seen that there is provided by the invention a bridge circuit, wherein the balance condition is indicated by a maximum rather than a minimum or zero indication and wherein an unbalance of the bridge in either a positive or negative direction will result in an instant reduction of the balancing current which is substantially independent of the currents flowing through the bridge circuit and may be adjusted or chosen to suit existing requirements or conditions.

In the arrangement according to Fig. 1, the anode currents of both triodes are returned through the common cathode circuit including the indicator I and either of the ratio resistances $R_4$ and $R_5$ of the bridge circuit. In order to render the current through the indicator substantially independent of the ratio adjustment or position of the contact $A_2$ and vice versa, resistors $R_9$ and $R_{10}$ should have a high value relative to the resistances of $R_4$ and $R_5$, whereby to substantially prevent variations of the current through the meter for ratio adjustments different from unity ratio.

In place of a composite or double-triode as shown in the drawing, a pair of separate triodes or grid controlled rectifiers may be provided as is understood. Series resistors $R_6$ and $R_7$ connected between the operating source and the bridge circuit serve to limit the bridge input voltage and current if relatively low unknown impedances are being measured and to maintain the potential at $A_2$ for the return or direct current circuit of the double wave rectifier substantially midway between the terminal potentials of the operating current source.

Referring to Fig. 2, there is shown a modification of the circuit of Fig. 1, wherein the rectifier circuit is substantially decoupled from the bridge or measuring circuit, although supplied from the same power source in substantially the same manner as in the preceding modification. For this purpose, the anodes $P_1$ and $P_2$ of the triode amplifiers are connected to the secondary winding of a transformer $Tr$ whose primary winding is connected to the alternating current source. The indicator I in this case is connected between the cathode and the center of the secondary winding of the transformer in series with resistance R₁₁ for adjusting the maximum or balancing current, in a manner understood from the foregoing. In this case, the maximum or balancing current passing through the indicator is independent of the bridge operating currents and may have a value in excess of the bridge current. This, in turn, will allow the use of a relatively simple and cheap current or balancing indicator without sacrifice of sensitivity and efficiency of the balancing operation. In other words, the indicating system comprising the rectifiers and the indicator I may be designed substantially independently of the bridge or measuring system, thus enabling a further simplification and reducing the cost of the complete unit.

Aside from the use as a testing or measuring device the bridge circuit or balancing arrangement according to the invention may be employed for various other uses and purposes embodying a balanced system and means for utilizing the unbalance current to produce an indicating control, or other effect in an associated device or output circuit.

While there has been shown and described a desirable embodiment of the invention, it is understood that this disclosure is for the purpose of illustration and that various changes in the arrangement of parts and circuits, as well as the substitution of equivalent parts and circuits for those herein shown and described, may be made without departing from the spirit and scope of the invention as defined in the appended claims. The specification and drawing are accordingly to be regarded in an illustrative rather than in a limiting sense.

I claim:

1. In a bridge circuit having a first branch comprising a pair of ratio impedance arms, a second branch comprising standard and unknown impedance arms, a source of alternating current, means for connecting said source to one pair of conjugate points of said bridge circuit, means for producing a pair of space discharge paths each comprising a cathode, an anode and control grid, means for connecting said anodes to the opposite terminals of said source, further means for establishing a common return circuit from said cathodes to a point of potential substantially midway between the terminal potentials of said source, a direct current indicator in said return circuit, and a grid coupling condenser and grid leak resistance coupling network connected between both said grids and cathodes in parallel with the remaining conjugate points of said bridge circuit.

2. In a bridge circuit having a first branch comprising an impedance potentiometer having a tapping contact to provide a pair of ratio arms, a second branch comprising standard and unknown impedance arms, a source of alternating current, means for connecting said source to one pair of conjugate points of said bridge circuit, means for producing a pair of space discharge paths each comprising a cathode, an anode and a control grid, means for connecting said anodes to the opposite terminals of said source, a common return circuit from said cathode to said contact, a direct current indicator in said return circuit, and a coupling network comprising a grid coupling condenser and grid leak resistance connecting the remaining conjugate points of said bridge circuit to both said grids and cathodes of said discharge paths in parallel.

3. In a bridge system as claimed in claim 2, including series impedance means connected between said source and said first conjugate points of said bridge circuit.

4. In a bridge system as claimed in claim 2, including series impedance means connected between said source and each of said anodes.

5. In a bridge circuit having a first branch comprising a resistance potentiometer having an adjustable contact to provide a pair of ratio arms, a second branch comprising standard and unknown impedance arms, a source of alternating current, means for connecting said source to one pair of conjugate points of said bridge circuit, further means for producing a pair of space discharge paths each comprising a cathode, an anode and a control grid, means for connecting the anodes of said discharge paths to the opposite terminals of said source, a common return circuit connected between the cathodes of said discharge paths and said contact, a direct current indicator inserted in said return circuit, a coupling network comprising a grid coupling condenser and a grid leak resistance connecting the remaining conjugate points of said bridge circuit to both the grids and cathodes of said discharge paths in parallel, index means connected to said adjustable contact, and scale means cooperating with said index means and calibrated in units of the unknown impedance.

6. In a bridge circuit having a first branch comprising an impedance potentiometer having a tapping contact to provide a pair of ratio arms, a second branch comprising standard and unknown impedance arms, a source of alternating current, means for connecting said source to one pair of conjugate points of said bridge circuit, means for producing a pair of discharge paths each having a cathode, an anode and a control grid, means including a center tapped impedance connected to said source and to the anodes of said discharge paths and a return circuit between the cathodes of said discharge paths and the center tap of said impedance, to provide a double wave rectifier circuit, a direct current indicator inserted in said return circuit, and a coupling network comprising a grid coupling condenser and a grid leak resistance connecting the remaining conjugate points of said bridge circuit to both the grids and cathodes of said discharge paths in parallel.

7. In a bridge circuit having a first branch comprising a resistance potentiometer having an adjustable contact to provide a pair of ratio arms, a second branch comprising standard and unknown impedance arms, a source of alternating current, means for connecting said source to one pair of conjugate points of said bridge circuit, means for producing a pair of space discharge paths each comprising a cathode, an anode and a control grid, further means including a center tapped transformer connected in parallel to both said source and the anodes of said discharge paths and a return circuit connected between the cathodes of said discharge paths and said contact, to provide a double wave rectifier circuit, a direct current indicator inserted in said return circuit, a coupling network comprising a grid coupling condenser and a grid leak resistance connecting the remaining conjugate points of said bridge to both the grids and cathodes of said discharge paths in parallel, index means for said adjustable contact, and scale means cooperating with said index means and calibrated in units of the unknown impedance.

8. An electrical circuit comprising a source of alternating current, a double-wave rectifier connected to said source having a pair of electronic rectifying paths and a direct current output circuit, a current indicator in said output circuit, an alternating current bridge circuit comprising four impedance arms, control electrodes for said rectifying paths, and a resistance-condenser coupling network connecting both said control electrodes with the output terminals of said bridge, to reduce the current through both said rectifying paths by an unbalance of said bridge in either sense from the balance condition.

9. An electrical circuit comprising a source of alternating current, a double-wave rectifier connected to said source having a pair of electronic rectifying paths and a direct current output circuit, a current indicator in said output circuit, a bridge circuit comprising four impedance arms, circuit connections between one pair of diagonal points of said bridge circuit and said source, control grids intercepting said rectifier paths, and a grid-leak condenser coupling network connecting both said grids with the remaining diagonal points of said bridge, to reduce the current through both said discharge paths by an unbalance of said bridge in either sense from the balance condition.

JOHN T. BAILEY.

REFERENCES CITED

The following references are of record in the file of this patent:

UNITED STATES PATENTS

| Number | Name | Date |
| --- | --- | --- |
| 2,434,822 | Van Beuren et al. | Jan. 20, 1948 |
| 2,434,823 | Van Beuren et al. | Jan. 20, 1948 |

FOREIGN PATENTS

| Number | Country | Date |
| --- | --- | --- |
| 385,982 | Great Britain | Jan. 9, 1933 |

OTHER REFERENCES

Hague, A. C.: Bridge Methods, 4th ed., 1938, pages 244, 245, 246.